2,975,147

COMPOSITION COMPRISING POLYESTER, PROTECTIVE COLLOID AND CLAY AND PAPER COATED THEREWITH

Corliss W. Abbott, Cranford, and Howard I. Freeman, Franklin Park, N.J., assignors to The Sherwin-Williams Company, Cleveland, Ohio, a corporation of Ohio No Drawing. Filed May 5, 1958, Ser. No. 732,811

9 Claims. (Cl. 260—7.5)

This invention is directed to the art of coating papers of various kinds, and more particularly to an improved composition for coating papers, and to papers coated therewith.

The coating of papers to improve the physical properties of both the surface and the internal structure of the untreated paper is well established. Coatings applied for the purposes of resistance to moisture, moisture vapor, grease, alkalies, chemicals, abrasion, etc. are well known, as are coatings used to impart gloss, better printing surfaces and heat-seal properties. Many of these coating compositions depend upon non-aqueous media, thereby introducing the hazards of organic solvents. The water based compositions of the prior art generally have been based on emulsions which, while avoiding the difficulties of safety hazard, have properties which make their use undesirable, such as, for example, in reclaiming operations. One type of resin which has apparently not been used heretofore in an aqueous medium is a polyester. The compositions of the present invention depend upon the use of a polyester as a part of the binder in the coating composition.

It has been found that papers coated with compositions made in accordance with this invention have very greatly improved properties, particularly in respect to printing, and more especially of printing on a multicolor press. Registration, definition, and ink "mileage" are substantially improved by the use of the compositions of this invention and by printing with papers coated with the compositions of this invention.

Still other objects of the invention will appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

Broadly stated, therefore, this invention is in the provision of a water-reducible paper coating composition containing (I) from about 3 parts to about 30 parts by weight of a binder on the dry basis comprising (a) a polyester and (b) a protective colloid in an aqueous solution and (II) from about 70 parts to about 97 parts by weight on the dry basis of a kaolinitic clay, the sum of I and II being 100 parts; said polyester being a polyester of an aromatic dibasic acid, a glycol and an alkyl polyol containing at least three hydroxyl groups attached to different carbon atoms, the ratio of hydroxyl to carboxyl in said polyester being in the range from about 0.9 to about 1.9, and the acid value thereof being in the range of from about 30 to about 85, and a paper web coated therewith.

It will be observed, therefore, that there are two basic ingredients contained in an aqueous medium and forming the principal elements of these novel compositions, namely, the binder or vehicle, and the kaolinitic clay.

It becomes convenient to discuss each of these principal ingredients individually and then illustrate the manner in which they are combined, and the manner in which they are applied to papers of various kinds.

THE BINDER

As indicated above, the binder portion of these compositions is composed of a polyester of a certain type and a protective colloid carried in an aqueous medium. Generally speaking, the polyester is the esterification product of an aromatic dibasic acid, e.g., phthalic acid or anhydride, isophthalic acid, terephthalic acid, and mixtures of these, with a mixture of aliphatic alcohols, one of which is glycol such as ethylene glycol, diethyleneglycol, propylene glycol, dipropylene glycol, butylene glycol, pentamethylene glycol, hexamethylene glycol, 1,1-isopropylidene (p-phenoxy) di-2-propanol and the like, and an alkyl polyol containing three or more hydroxyl groups attached to different carbon atoms and from 3 to 10 carbon atoms, for example, glycerol, pentaerythritol, di- and tri-pentaerythritol, trimethylolethane, trimethylolpropane, mannitol, sorbitol, etc.

The protective colloid or "glue" is generally of the water-soluble or dispersible type such as, for example, hydrolyzed starch, casein, sodium alginate, ammonium alginate, methyl cellulose, soya bean protein, zein, gum tragacanth and Guar gum. The ratio of the protective colloid to the polyester generally useful for the purposes of this invention is from about 100:1 to about 1:1, with a 2:1 ratio being quite satisfactory.

THE POLYESTER

In general, the polyesters useful in accordance with this invention may be produced from a fusion type cook at a temperature of from about 375–400° F. until the acid value of the cook is in the range of from about 30 to about 85. Solvent cooking of such polyesters may also be employed. The ratio of total hydroxyl to carboxyl in these polyesters is generally from about 0.9 to about 1.9. The polyesters, when ready to be formulated into the coating compositions of this invention, are conveniently dispersed in an aqueous medium with the aid of suitable dispersion aids or solubilizers such as, for example, a water-soluble monoalkyl alkylene glycol ether, an aliphatic water-soluble low molecular weight alcohol containing from 1 to 4 carbon atoms, and aqueous basic solutions. Such aqueous dispersions or solutions of the polyester are conveniently made at concentrations of from about 75% to about 90%, although this concentration can be varied within wide limits depending upon convenience to the formulator.

As indicated above, the dibasic aromatic carboxylic acid is conveniently phthalic acid or its anhydride or any of the isomers of phthalic acid. Substitution products such as the mono, di, tri, and tetrachlorophthalic acids may also be used as well as the alkyl substituted derivatives of phthalic acid, e.g., m-methyl phthalic acid or anhydride.

The alcoholic components of these polyesters are generally two in number, one of which is a glycol, or alkylene glycol in which the alkylene group contains from 2 to 6 carbon atoms. Examples of such alkylene glycols include ethylene glycol, diethylene glycol, propylene glycol, dipropylene glycol, butylene glycol, dibutylene glycol, pentamethylene glycol, (amylene glycol), hexamethylene glycol, etc.

The other aliphatic alcohol generally contains 3 or more hydroxyl groups attached to different carbon atoms in the molecule such as, for example, glycerol, pentaerythritol, di-pentaerythritol, tri-pentaerythritol, sorbitol, mannitol, trimethylolethane, trimethylolpropane. For most purposes, the normal ratio of glycol to polyol is in the range of from about 1:1 to about 10:1. A convenient ratio of glycol to polyol is in the range of from 6:1 to 8:1.

It is convenient to give specific illustrative examples of polyesters which may be used in the preparation of paper coating compositions in accordance with this invention. It is to be understood that these examples as well as the other examples contained in this specification are merely for the purpose of pointing out a manner in which the invention may be practiced, it being well within the skill of those familiar with this art to make additional examples in accordance with the instructions herein contained.

*Example 1*

| | Moles |
|---|---|
| Dipropylene glycol | 2.44 |
| Phthalic anhydride | 2.85 |
| Pentaerythritol | 0.32 |

In this polyester, the ratio of hydroxyl to carboxyl is 1.08. These ingredients were reacted in a fusion type cook at a temperature between 375°–400° F. until the acid value was 65.

To this resin base was added 0.1125 times the weight of the resin of a mixture composed of 23.0% of monobutylethylene glycol ether and 77% n-propanol. To this solution was added a similar weight (0.1125 times the weight of the resin) of 29% aqueous ammonium hydroxide. This latter procedure is referred to herein as "thinning" the resin.

*Example 2*

This example illustrates a case in which the hydroxyl : carboxyl ratio was 0.94.

| | Moles |
|---|---|
| Dipropylene glycol | 4.18 |
| Phthalic anhydride | 5.88 |
| Pentaerythritol | 0.56 |

These ingredients were reacted for a period of 8 hours at a temperature of 395° F., the time sufficient to yield an acid value of 65.

1360 grams of this resin were dissolved into an aqueous thinner medium composed of 39 grams of monobutyl ethylene glycol ether, 131 grams of n-propanol, and 170 grams of 29% aqueous ammonium hydroxide solution. The material is water-reducible.

*Example 3*

1360 grams of the resin produced in accordance with Example 2 were dissolved in a thinner solution composed of 39 grams of monobutylethylene glycol ether, 131 grams of n-propanol, 104 grams of monoethanolamine and 66 grams of water. This material is water-soluble.

This example illustrates the use of another basic material, namely an organic base instead of ammonia as a solubilizing aid. Other such organic bases conferring water solubility on the polyester are diethanolamine, triethanolamine, diethylamine, morpholine, pyridine and the like. Such water-soluble non-metallic basic materials as these and others which will occur to those skilled in the art are useful in accordance herewith. Inorganic bases such as the alkali metal hydroxides, e.g., sodium hydroxide, potassium hydroxide, lithium hydroxide may be used for this purpose.

*Example 4*

This example illustrates a hydroxyl : carboxyl ratio of 1.44.

| | Moles |
|---|---|
| Dipropylene glycol | 6.51 |
| Phthalic anhydride | 5.88 |
| Pentaerythritol | 0.86 |

These ingredients were reacted for a period of 8 hours at a temperature of 380° F. to an acid value of 52.3 in a fusion type cook. This composition was thinned as previously in Example 1. The material is water-reducible.

*Example 5*

The resin of Example 4 was thinned with 0.1125 times the weight of the resin of a 23% monobutylethylene glycol ether, 77% n-propanol mixture, and an equal weight (0.1125 times the weight of the resin) of 50% monoethanolamine-50% water mixture. This composition is water-reducible.

*Example 6*

| | Moles |
|---|---|
| Ethylene glycol | 4.0 |
| Phthalic anhydride | 5.7 |
| Trimethylolethane | 0.6 |

This composition may be thinned with a mixture of monobutylethylene glycol ether and n-propanol, and aqueous ammonia as provided in Example 1. The material is water-reducible.

*Example 7*

| | Moles |
|---|---|
| Hexamethylene glycol | 2.4 |
| Ethylene glycol | 2.4 |
| Phthalic anhydride | 5.4 |
| Terephthalic acid | 0.2 |
| Pentaerythritol | 0.3 |

This ester may be thinned with the same thinning composition as disclosed in Example 1 to provide a water-reducible composition.

*Example 8*

| | Moles |
|---|---|
| Phthalic anhydride | 0.75 |
| Dipropylene glycol | 0.701 |
| Glycerol | 0.123 |

This composition when cooked in the manner of Example 1 had an acid value of 62 and was dissolved to a concentration of about 77½% solids in the thinner of Example 1. The material was water-reducible.

*Example 9*

| | Moles |
|---|---|
| Phthalic anhydride | 0.75 |
| Dipropylene glycol | 0.701 |
| Trimethylolethane | 0.123 |

The foregoing ingredients when cooked in accordance with the procedure of Example 1 and dissolved in the aqueous thinning medium of said example yielded a water-reducible material.

*Example 10*

| | Moles |
|---|---|
| Phthalic anhydride | 0.75 |
| Ethylene glycol | 0.701 |
| Pentaerythritol | 0.092 |

The foregoing ingredients were reacted and thinned in accordance with the procedure of Example 1 to yield a water-reducible material.

*Example 11*

| | Moles |
|---|---|
| Phthalic anhydride | 0.75 |
| Ethylene glycol | 0.701 |
| Glycerol | 0.123 |

This material when cooked in accordance with the procedure of Example 1 had a final acid value of 48.5 and was thinned in the same proportion and with the same materials as given in Example 1 to yield a water-reducible material.

Example 12

| | Moles |
|---|---|
| Phthalic anhydride | 0.75 |
| Ethylene glycol | 0.701 |
| Trimethylolethane | 0.123 |

These materials when reacted in accordance with the procedure of Example 1 produced a product having an acid value of 38, and when dissolved in the thinner of Example 1 produced a water-reducible material.

Example 13

| | Moles |
|---|---|
| Phthalic anhydride | 0.75 |
| 1,1-isopropylidene (p-phenoxy) di-2-propanol | 0.701 |
| Pentaerythritol | 0.092 |

These ingredients when reacted in accordance with the procedure of Example 1 yielded a resin having an acid value of 42.8. This resin was thinned in accordance with the instructions of Example 1 to yield a water-reducible material.

Example 14

The resin of Example 13 was reproduced substituting for the 0.092 mole of pentaerythritol 0.123 mole of glycerol. This resin was cooked to an acid value of 47.5 and thinned as in Example 1 to give a water-reducible material.

Example 15

The resin of Example 13 was reproduced substituting for the 0.092 mole of pentaerythritol 0.123 mole of trimethylolethane to yield a product having an acid value of 56.5.

THE PROTECTIVE COLLOID

As previously indicated, the protective colloid or "glue" forming a second principal ingredient in these coating compositions may be generally any water-soluble or water-dispersible material which will adhere well to the paper web and help to keep the clay in suspension. A very satisfactory protective colloid is casein, most conveniently employed as a 10%–18% aqueous casein solution. Other suitable protective colloid materials include the various water-soluble gums such as Guar gum in concentrations up to about 2 or 3% by weight. Methyl cellulose, hydrolyzed starch, gum tragacanth, soya bean protein, detoxified castor bean protein, sodium alginate, ammonium alginate, etc. in aqueous solutions are also useful as this portion of the binder.

Regardless of the concentration of the protective colloid in the aqueous medium, the general weight ratio of the protective colloid to the polyester is in the range of from about 100:1 to 1:1. A convenient ratio is about ⅔ protective colloid and ⅓ polyester on a 100% solids basis.

From a practical point of view, it is more convenient to maintain the polyester solution and the protective colloid solution separate, using the polyester solution as the medium into which the clay is blended, although the dispersion of the clay in the protective colloid solution may be found desirable in certain instances.

THE CLAY

The kaolinitic clays of this invention are generally of the aluminum silicate type having the formula:

Among the clays which are useful in accordance herewith are china clay, porcelain clay, white clay, terra alba, etc. These are found domestically in Georgia, the Carolinas, Alabama and Florida. Considerable deposits are found in England.

The largest portion of the solids material in the paper coatings compositions of this invention is generally a kaolinitic clay. It amounts to from 70% to 97% of the solids portions of these compositions comprising the clay plus the binder. Other pigmentary materials useful in addition to the clay include titanium dioxide, calcium carbonate, etc.

A convenient form for utilizing the clay in these compositions is as a slurry in water containing a very minor percentage, not more than about 0.5% by weight of the clay of a wetting agent. A convenient composition is as follows:

| | Grams |
|---|---|
| Kaolin clay | 300 |
| Water | 128 |
| Sodium hexametaphosphate | 0.9 |

These ingredients are slurried in a suitable mixer in amounts of the size indicated above, and conveniently admixed in a Waring Blendor. The concentration of the clay in the slurry is not, of course, significant, the foregoing example being merely illustrative of a convenient slurry.

Other clays of plate type crystalline nature may be used in this invention, the preference being, however, for the kaolinitic type because of its purity, whiteness and availability. Other pigmentary materials may be included in these compositions to impart better hiding, improved color or colors of particular selection. Such pigments include titanium dioxide, calcium carbonate, iron oxide, carbon black, etc.

It becomes convenient, therefore, to give specific examples illustrative of paper coating compositions formulated in accordance with this invention and employing the ingredients above discussed.

Example 16

150 grams of kaolin, 64 grams of water and 1.5 grams of sodium hexametaphosphate were slurried in a Waring Blendor. 180 grams of a 10% aqueous casein solution were added to the slurry and agitated in the blender. To this was then added 10.9 grams of the thinned resin of Example 4. This composition is at an 18% binder level calculated on the clay present with the binder being ⅔ casein and ⅓ polyester, all on a dry weight basis. This composition was applied to offset paper by a conventional paper coating method and checked by means of the conventional wax pick test for adhesion. A very satisfactory coated paper was obtained. Calculated on the basis of 100 parts of dry binder plus clay, this composition contained 84.6 parts kaolin and 15.4 parts binder.

Example 17

150 grams of kaolin, 64 grams of water and 1.5 grams of sodium hexametaphosphate were slurried in a Waring Blendor. 180 grams of a 10% aqueous casein solution were added to the slurry and further agitated in the blender. To this admixture was then added 10.5 grams of the thinned resin of Example 5. This coating composition is at an 18% binder level calculated on the clay present with the binder being ⅔ protective colloid and ⅓ polyester, all on a dry weight basis. On the basis of 100 parts of dry binder plus clay, the composition contains 84.6 parts clay and 15.4 parts binder. This coating composition was applied to offset paper by a conventional manner and checked by means of the conventional T.A.P.P.I. wax pick test for adhesion. A very satisfactory coated printing grade paper was obtained by this example. This composition is also useful as a coating for kraft, gravure and letter press papers.

Example 18

50 grams of kaolin, 21.3 grams of water and 0.5 gram of sodium hexametaphosphate were slurried in a Waring Blendor as in the previous two examples. 54 grams of a 10% aqueous casein solution were added and the agitation continued until a smooth composition was obtained. 3.6 grams of the thinned resin of Example 1 were added, and the agitation continued to produce a smooth composition. This coating composition was applied directly to an offset paper to produce a very satisfactory printing paper. This composition is also useful as a coating for kraft, gravure and letter press papers. The binder level was 16.6% calculated on the clay present, with the binder being 65.2% protective colloid and 34.8% polyester resin, all on the dry weight basis. Calculated on the basis of 100 parts of dry binder plus clay, this composition contains 14.3 parts binder and 85.7 parts clay.

*Example 19*

Following the same formulation as given in Example 18 above, the 3.6 grams of the thinned resin of Example 1 may be replaced with 3.6 grams of the thinned resin of Example 3.

Again, a satisfactory coated paper is obtained.

*Example 20*

100 grams of kaolin, 42 grams of water and 1 gram of sodium hexametaphosphate are slurried in a Waring Blendor as in the previous examples. 40 grams of a 10% aqueous casein solution are added and the agitation continued until a smooth composition is obtained. 2.45 grams of the thinned resin of Example 1 are added and the agitation continued to produce a smooth composition. This coating composition may be applied directly to a paper web for the production of slip sheets. The binder level is 6% calculated on the clay present, with the binder being ⅔ protective colloid and ⅓ polyester resin, all on the dry weight basis. Calculated on the basis of 100 parts of dry binder plus clay, this composition contains 5.7 parts binder and 94.3 parts clay.

All of the coatings above described had conventional T.A.P.P.I. wax pick tests greater than eight, which is considered most satisfactory.

As previously indicated, and as illustrated above, the amount of binder with respect to the amount of clay on the basis of 100 parts of the dry combination is about 3 parts to 30 parts binder, with the balance being clay. These proportions may vary widely, depending upon the type of paper being made and the ultimate use to which it is to be put. Where the paper web is to be used for covering tar or in the production of slip sheets, and "release" coatings are desired, the amount of binder is in the range of from 3 to 6 parts/100 parts of the dry combination. For letter press papers, the amount of binder is generally in the range of from about 6 parts to about 25 parts. For offset printing papers, the amount of binder is generally in the range of from 10 parts to 25 parts/100 parts of the dry combination. For gravure papers and flexographic papers the binder is in the amount of from about 10 parts to 30 parts, clay being the balance of the composition.

For the coating of kraft papers, a very wide range of from 4 parts to 25 parts binder, with the balance being clay or a mixture of clay with other of the aforementioned pigments may be used.

Also as previously indicated, these coatings are applied by conventional methods. One such conventional method is by means of a roll coater consisting of two rolls placed vertically, one above the other. The bottom roll dips into a coating pan and picks up the coating and applies it to the paper as it passes between the two rolls. The thickness of the coating is adjusted by the opening between the two rolls. As the rolls are quite hard, as they are if made of metal, coatings of desired weights, e.g., from 3–30 lbs. per ream may be easily applied. A "ream" is considered as 500 sheets 25" x 38". In addition to the main rolls, doctor rolls and smoothing rolls may be added to smooth out ridges which occur especially when higher viscosity coatings are employed. Various other roll type application or dip application, or knifing, can be used in addition to air brush coating, spray coating, print roll coating, etc. The coated papers are dried by passing over hot rolls with temperatures up to 300° F. Other drying means, e.g., infra-red or festooning, may be employed.

The papers produced in accordance with this invention and with the coatings of this invention are particularly useful in that the characteristics obtained therewith, particularly in the field of color printing, are extremely desirable and satisfactory. Printers have reported an ease of handling, improved ink "mileage," and much better reproduction than heretofore available. Although it had previously been thought that polyesters were unsatisfactory materials for use in paper coatings, their use in the manner set forth herein yields a result which appears to be superior to those obtainable with more conventional materials. The detail of the prints obtained from offset papers and letterpress papers coated with these compositions are exceptional because of the leveling characteristics of the coating. Varnishability of these papers is quite satisfactory.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A water-reducible paper coating composition containing (I) from about 3 to about 30 parts by weight on the dry basis of a binder comprising (a) a polyester and (b) a protective colloid in an aqueous solution, the weight ratio of protective colloid to polyester being from about 100:1 to about 1:1, and (II) from about 70 parts to about 97 parts by weight of a kaolinitic clay, the total of (I) and (II) being 100 parts; said polyester being a polyester of a phthalic acid material selected from the group consisting of phthalic acid, isomers of phthalic acid, monochloro phthalic acid, dichloro phthalic acid, trichloro phthalic acid, tetrachloro phthalic acid, and alkyl substituted derivatives of phthalic acid, and anhydrides thereof; a $C_2$–$C_6$ glycol, and a $C_3$–$C_{10}$ polyhydric alcohol containing at least three hydroxyl groups attached to different carbon atoms, said polyhydric alcohol being composed of only the elements carbon hydrogen and oxygen, the ratio of hydroxyl to carboxyl in said polyester being in the range of from about 0.9 to about 1.9 and the acid value thereof being in the range of from about 30 to about 85.

2. A water-reducible paper coating composition containing (I) from about 3 parts to about 30 parts by weight on the dry basis of a binder comprising (a) a polyester and (b) a protective colloid in an aqueous solution, the weight ratio of protective colloid to polyester being from about 100:1 to about 1:1, and the total amount of polyester and protective colloid in said aqueous solution being from about 2% to about 20% by weight of said aqueous solution, and (II) from about 70 parts to about 97 parts by weight of a kaolinitic clay, the total of (I) and (II) being 100 parts; said polyester being a polyester of a phthalic acid material selected from the group consisting of phthalic acid, the isomers of phthalic acid, monochloro phthalic acid, dichloro phthalic acid, trichloro phthalic acid, tetrachloro phthalic acid, and alkyl substituted derivatives of phthalic acid, and anhydrides thereof; a $C_2$–$C_6$ alkylene glycol, and an aliphatic polyhydric alcohol containing from 3 to 10 carbon atoms and at least 3 hydroxyl groups attached to different carbon atoms, said polyhydric alcohol being composed of the elements carbon hydrogen and oxygen only, the ratio of hydroxyl to carboxyl in said polyester being in the range of from about 0.9 to about 1.9 and the acid value thereof being in the range of from about 30 to about 85.

3. A composition in accordance with claim 1 wherein the polyester is a phthalic anhydride/dipropylene glycol/pentaerythritol resin.

4. A composition in accordance with claim 1 wherein the protective colloid is casein.

5. A composition in accordance with claim 1 wherein the kaolinitic clay is kaolin.

6. A composition in accordance with claim 1 wherein the polyester is a phthalic anhydride/dipropylene glycol/pentaerythritol resin, the protective colloid is casein, and the kaolinitic clay is kaolin.

7. A composition in accordance with claim 1 wherein the glycol is 1,1-isopropylidene (p-phenoxy) di-2-propanol.

8. A paper web coated with a composition in accordance with claim 1.

9. A paper web coated with a composition in accordance with claim 6.

References Cited in the file of this patent

UNITED STATES PATENTS

| | | |
|---|---|---|
| 2,022,004 | Larson | Nov. 26, 1935 |
| 2,317,668 | Cheetham et al. | Apr. 27, 1943 |
| 2,487,448 | Kingerley | Nov. 8, 1949 |

FOREIGN PATENTS

| | | |
|---|---|---|
| 422,130 | Great Britain | Jan. 7, 1935 |